(12) United States Patent
Livingston et al.

(10) Patent No.: US 6,400,088 B1
(45) Date of Patent: Jun. 4, 2002

(54) INFRARED CARBON NANOTUBE DETECTOR

(75) Inventors: Peter M. Livingston, Palos Verdes; Lihong Wang, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/713,407

(22) Filed: Nov. 15, 2000

(51) Int. Cl.$^7$ ............................................... H05B 39/00
(52) U.S. Cl. ...................................... 315/94; 250/338.1
(58) Field of Search .................. 315/94, 99; 250/338.1, 250/336.1, 339.11, 339.14, 356.1

(56) References Cited

U.S. PATENT DOCUMENTS

| | | | |
|---|---|---|---|
| 5,367,222 A | * 11/1994 | Binkley | .................. 315/12.1 |
| 5,479,018 A | * 12/1995 | McKee et al. | ........... 250/338.1 |
| 6,118,125 A | * 9/2000 | Carlson et al. | .......... 250/385.1 |

* cited by examiner

*Primary Examiner*—Don Wong
*Assistant Examiner*—Thuy Vinh Tran
(74) *Attorney, Agent, or Firm*—Robert W. Keller

(57) ABSTRACT

A detector for detecting infrared photons is disclosed. It comprises an anode, a cathode including a plurality of nanotubes formed from carbon and means for electrically connecting the nanotubes, and bias circuitry for applying an electric field between the anode and the cathode such that when infrared photons are absorbed by the nanotubes, photoelectrons are created. A gate electrode is disposed between the anode and the cathode and controls the passage of the photoelectrons passing therethrough. A pulse height analyzer separates photoelectrons from electrons created by field emission from the nanotubes and serves to measure the photoelectrons.

21 Claims, 1 Drawing Sheet

INFRARED CARBON NANOTUBE DETECTOR

BACKGROUND OF THE INVENTION

1. Field of the Invention

This invention relates generally to an infrared photon detector and, more particularly, to an instrument for detecting and counting infrared photons having an energy of about 1 electron volt.

2. Discussion of the Related Art

Photon-counting detectors operating in the visible, ultraviolet and x-ray region of the radiation spectrum play an extremely useful role in astronomy and physics. With deep-space communications becoming a necessity in the near future as space-travel develops, photon-counting detectors will be essential. Present photon-counting techniques utilize the photoelectric effect to relate the ejected photoelectron current to the incident photon flux. However the energy of the detected photons must exceed the detector-metal-work-function, which, for the metal with the smallest work function, Rubidium, is 2.16 electron volts. Therefore photons with wavelengths longer than 0.425 microns will not be detected by a photon counter. Unfortunately, most popular solid-state lasers that are used in communications at present, operate at about 1 micron wavelength corresponding to a photon-energy of about 1.2 electron volts. Infrared detectors, based on semiconductor materials, do exist. In these, the work-function energy is replaced by the band-gap energy that exists between the semiconductor's valence and conduction bands. If the absorbed photon's energy exceeds the band-gap energy, a hole-election pair is created that is detected by the electrical apparatus connected to the semiconductor. Unfortunately, there are other means of generating hole-electron pairs in semiconductor detectors in addition to photon absorption, that make single-event infrared photon counting impossible.

What is needed, therefore, is an instrument for detecting and counting individual visible and infrared photons having energies less than 2 electron volts that can operate at room temperature.

SUMMARY OF THE INVENTION

In accordance with the teachings of the present invention, a detector for detecting infrared photons with an energy approximating 1 ev is disclosed. The detector comprises a glass tube having an aperture for receiving the infrared photons and enclosing an anode, a gate electrode, a cathode, and a dynode multiplier chain. The cathode comprises a plurality of carbon nanotubes with a conductive film that electrically connects the nanotubes. The anode, gate electrode and cathode are biased such that when infrared photons are absorbed by the nanotubes, photoelectrons are created. The flow of photoelectrons within the glass tube is controlled by the gate electrode and multiplied by the multiplier chain. A counter is included for counting the multiplied photoelectrons.

Additional objects, advantages and features of the present invention will become apparent from the following description and appended claims, taken in conjunction with the accompanying drawings.

DETAILED DESCRIPTION OF THE PREFERRED EMBODIMENT

The following discussion of the preferred embodiment directed to an instrument for detecting and counting infrared photons having an energy approximating 1 ev is merely exemplary in nature and is in no way intended to limit the invention or its applications or uses.

Figure 1:
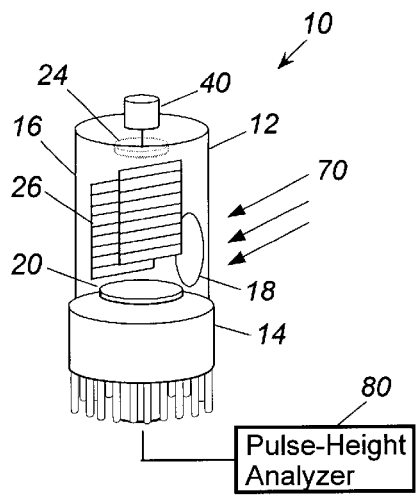
FIG. 1 Is a diagrammatic view of an infrared carbon nanotube detector system in accordance with the present invention.
Figure 2:
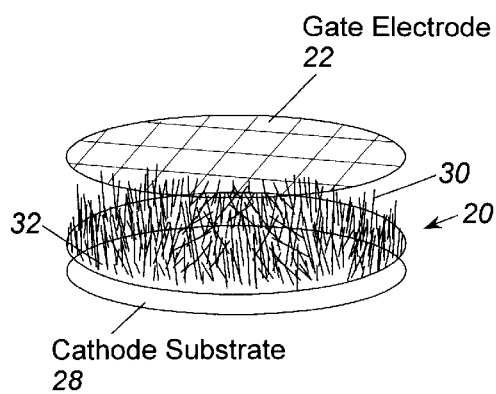
FIG. 2 is a magnified perspective view of the cathode assembly and gate electrode of the infrared carbon nanotube detector shown in FIG. 1.

FIG. 1 is a diagrammatic view of the infrared carbon nanotube detector system 10, according to an embodiment of the present invention. The system 10 includes a housing, or vacuum tube, 12 having a tubular shape with a base 14, and an enclosure 16 formed of glass with an aperture 18 therethrough. The base 14 includes a stem for evacuating the tube (not shown), and conductive pins protruding therefrom to carry bias voltages and signals to and from the electrodes as will be subsequently described. Also with reference to FIG. 2, photocathode (also referred to as a cathode assembly) 20, a gate electrode 22 having a mesh configuration (also referred to as a grid), an anode electrode 24 and an electron multiplier 26 are disposed within the glass housing 12. As shown in FIG. 2 and as will be described in more detail the cathode assembly 20 includes a substrate 28, a multiplicity of carbon nanotubes or fibers 30 electrically interconnected by a layer of electrically conductive material 32 disposed on the substrate 28. Preferably the layer 32 is comprised of polytetrafluoroethylene (PTFE) film.

In the preferred embodiment, the housing, base, anode, gate electrode and electron multiplier are preferably identical to corresponding elements found in a conventional side-look photomultiplier tube (PMT).

Figure 3:
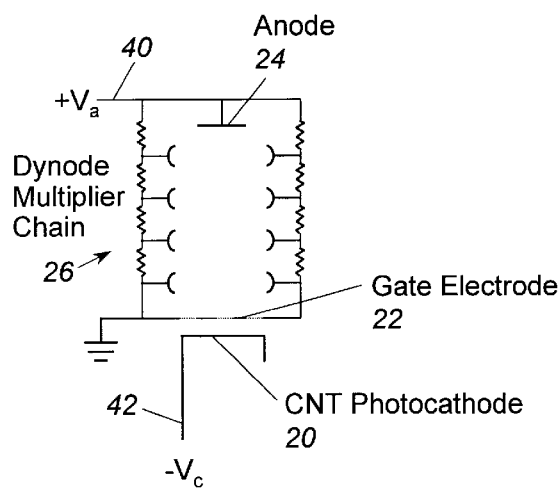
FIG. 3 is an electrical schematic diagram of the infrared carbon nanotube detector of FIG. 1.

FIG. 3 shows a schematic diagram of the PMT. As shown, bias circuitry including dc power supplies 40 and 42 and the dynode multiplier chain 26 is used to maintain the anode 24 at $+V_a$ potential, the gate electrode 22 at ground potential, and the photocathode 22 at $-V_c$ potential via appropriate correction to the pins of the base 14.

Figure 4:
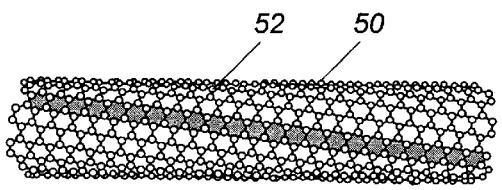
FIG. 4 is a plan view of the carbon nanotube used in the cathode of the detector in accordance with the present invention.

The carbon nanotubes 30 (CNT) are preferably formed from sheets of graphene 50 (a single layer of carbon atoms from a 3D graphite crystal) rolled up into a cylinder as shown in FIG. 4 and capped at each end with a half-fullerene molecule. The graphene sheet 50 tiles a two-dimensional surface with interlocking hexagons formed of carbon 52 and its valance bonds. To form a cylinder, the sheet is 'cut' along certain directions, and rolled along the long axis forming an invisible seam with the other cut edge. There are a finite number of ways the sheet can be cut and rolled to form an invisible seam. Of these, one way shows no 'twist' or chirality, in the pattern of hexagons, whereas others show twists of varying degrees dependent on how frequently a given pattern of hexagons around the tube circumference repeats itself. Details of this process are given in the article by M. S. Dresselhaus, G. Dresselhaus and P. C. Eklund, entitled "Science of Fullerenese and Carbon Nanotubes", and published by the Academic Press, New York, 1996, p. 757. Note that depending on chirality or 'twist', a carbon nanotube is either a conductor or a semiconductor as determined by the difference of chirality indices.

More particularly, FIG. 4 shows a model of a scanning microscope image of a carbon nanotube 30. It has a diameter of approximately 1.0 nanometers and a chirality of (11,7). Naturally produced nanotubes are a mixture of tubes with various chiralities. Tubes in an 'armchair' configuration are metals.

Carbon nanotubes 30 may also be created by various well-known processes, such as vapor growth methods, laser vaporization, and carbon arc generation. The Hyperion company, produces conductive plastic by mixing carbon nanotube fuzz with various plastic bases.

Arrays or multiplicities of the carbon nanotubes can be created in various ways. For example, one technique is to deposit a large sheet. Another method is to mix nanotube fuzz with an epoxy plastic and then microtome slices from the hardened block. It has been found that the nanotubes are tough enough to withstand the cutting process and thus stick up from the substrate. Physical contact between adjacent nanotubes in the matrix assure a conductivity therebetween and when mounted on a conducting substrate 28, forms a satisfactory cathode electrode.

The PTFE film 32 is constructed in accordance with the teachings of De Heer, et al., Science, 270, 1179, (1995). This construction produces an aligned nanotube film at room temperature with the CNTs 30 aligned perpendicular to and anchored on, the PTFE film 32.

Carbon nanotube arrays are considered as a low-voltage field emission source. For a particular arrangement, electron field emission can occur at a turn-on voltage of 200 volts. For this embodiment its behavior is predicted by the Fowler-Nordheim field emission equation, as will be subsequently described.

Figure 5:
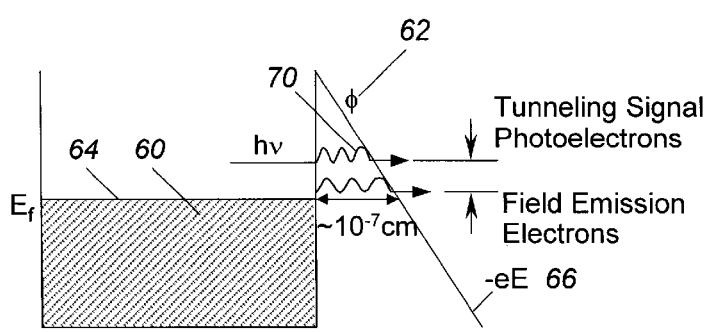
FIG. 5 is an energy-level diagram illustrating surface absorption of an infrared photon in the carbon nanotube.

It is known that the work function of CNT's is most likely that of the parent graphene, about 5 ev. Thus the metallic form of CNT's resembles aluminum, mercury and tungsten. Accordingly, CNT photoemission in the infrared region where the photons are less than one electron volt was not expected. Unexpectedly, however, when a sufficient negative voltage is applied to a CNT photocathode, photoelectrons created by surface absorption of an infrared photon tunnel through the surface potential barrier. FIG. 5 shows an energy diagram schematically illustrating this.

FIG. 5 is an idealized energy diagram showing the electron energy states in CNTs. In the diagram, the ordinate is the energy level and the abscissa is distance. The region 60 denotes the filled energy states constituting the Fermi Sea. The work function 62, denoted by $\phi$, is a function of the material, surface, and so on, but is about 5 ev above the Fermi level, $E_f$ or 64. An application of an electric field, E, as shown in its energy equivalent as—eE, 66 creates a triangle-shaped barrier whose slope is proportional to the field strength. At sufficiently high electric fields, electrons 'evaporate' from the Fermi surface 64 and tunnel through the barrier in a process known as 'field emission.' Ordinarily all metals are reflective at infrared photon energies. However, even in such metals light penetrates several thousand atomic separation distances into the lattice. But the CNT 'metal' looks like lamp black in the visible region of the electromagnetic spectrum, demonstrating complete photon absorption. It is probable that it will appear the same in the infrared region as well.

FIG. 5 also illustrates that enhanced photoelectrons emitted in the presence of infrared light designated as hv and by the wiggly arrow 70, will have energies higher than those tunneling through the barrier from atop the Fermi sea and therefore are readily distinguishable from the latter. Thermionic emission from the device is much lower than field emission because of the small thermal energies involved. dark current emitted in the dark comprising electrons which have one or two narrow peaks, and a width of between 0.15 and 0.2 ev. The analyzer can be set to reject electron pulses below a predetermined value corresponding to dark field emission, but counting photoelectron cascades arising from absorption of IR photons. Hence, the single photoelectron events can be counted. Thus the detector system is a very sensitive infrared detector.

It should also be recognized that varying the voltage of the photocathode will change the sensitivity of the device to various infrared photons. In particular, the higher the voltage, the more readily long wavelength photons will tunnel through the barrier to exit as photoelectrons.

Since the barrier slope varies with the applied electric field, it follows that changing the threshold voltage can be used to detect progressively redder infrared photons until finally energy discrimination fails to separate daughters of the field emission electrons from the photoelectron progeny. Note that FIG. 5 shows the energy difference between signal and field emission electrons. When the gap no longer exists, infrared photon detection ceases.

In operation, infrared radiation shown by the numeral 70 in FIG. 1 enters the aperture 14 of the housing 12 and passes through the gate electrode mesh 22 onto the CNT cathode 20. The gate electrode 22 is at ground potential and the cathode 20 is maintained at $-V_c$ by the dc power supply 42. Some electrons expelled from the tips of the CNT 30 pass through the grid 22 to impact the first multiplier dynode 26 charged positively with respect to the grid 22. The original photoelectron cascades into a large number of secondary electrons as the impulse passes up the dynode chain to the anode 24. The pulse analyzer 80 is connected to the anode 24 and to a pin on the base of the tube. It is set to reject the electron pulses below a predetermined value that corresponds to dark field emission. It thus counts the photoelectrons arising from the absorption of the IR photons 70.

In this invention, carbon nanotubes hold distinct advantages over metal fibers for use as field emitters. Metals show tip densities of $10^5$ square cm but CNT's show tip densities 1000 times larger. Moreover, the small size of the CNT tips, which is on the order of several nanometers cause the local electric field to be amplified by field enhancement factors of between 500 to 1300 compared with tip amplification factors of 10 for metals. This means that CNTs will operate under much lower voltage for the same field emission. Hence there is much less heat dissipation in the CNT's.

The Fowler-Nordheim equation describes field emission current density $j_f$ from a metal under an applied electric field E or voltage V:

$$j_f = aE_{eff}^2 e^{-\frac{b}{E_{eff}}} = a'V^2 e^{-\frac{b'}{V}}. \tag{1}$$

In the equation, the respective b's arise directly from a Wentzel-Kramers-Brilloun quantum tunneling computation through the barrier (see FIG. 5) whereas the prefactor accounts for the state density and electron flux into the surface. Thus b or b' can be shown to be proportional to the "effective" work function, $E_{eff}$, to the 3/2 power. Effective means the work function measured from the Fermi energy or from the Fermi energy plus the absorbed photon energy depending on the electron's origin. Also, $E_{eff}=\gamma E$, where $\gamma$ is the field enhancement factor e.g. 500–1300 described above.

When the CNT detector arrangement is used in a current mode, then from eq (1) 'dark' field emission current is enhanced in the presence of IR photons according to:

$$j_{f,h\nu} \approx j_f e^{\frac{3b}{2V}\frac{h\nu}{\phi}}; h\nu < \phi. \quad (2)$$

A more complete description of this is found in the reference article by R. H. Fowler and L. Nordheim, Proc. Roy. Soc. Lond., A119, 173 (1928).

The present invention fills a niche in infrared detection. IR photon counting will aid astronomers looking at the most distant parts of our universe. The device advantageously operates at room temperature without the need for cooling. Moreover, the present invention provides highly sensitive IR detection for use in thermal imaging, intruder detection, satellite surveillance and optical communications.

In the preferred embodiment, the gate electrode 22 is spaced about 0.02 mm above the film 32, and is a 70% transmitting 200 mesh electron microscopy copper grid. The diameter of the photocathode 20 is about 1.0 centimeter and its turn on voltage is around 200 volts in the dark. Its dark current emitted electrons have a narrow peak, sometimes two, with widths around 0.15 to 0.2 ev. These are easily distinguishable from the higher energy photoelectrons.

In an alternative embodiment the substrate of the photocathode can be made from a material that is transparent to IR radiation. This enables the photocathode to be illuminated efficiently from its underside by the IR radiation. It should also be recognized that other photomultipliers with different shapes and sizes could be used.

Obviously, many modifications and variations of the present invention are possible in view of the above teachings. Thus, it is to be understood that, within the scope of the appended claims, the invention may be practiced otherwise than as specifically described above.

What is claimed is:

1. A detector for detecting infrared photons comprising:
   an anode;
   a cathode including a plurality of nanotubes formed from carbon and means for electrically connecting said nanotubes; and
   bias circuitry for applying an electric field between said anode and said cathode such that when infrared photons are absorbed by said nanotubes, photoelectrons are created.

2. The detector as recited in claim 1 and further comprising a circuit for measuring the number of photoelectrons.

3. The detector as recited in claim 2 wherein said circuit for measuring comprises a pulse-height analyzer for separating photoelectrons from electrons created by field emission from said nanotubes.

4. The detector as recited in claim 1 and further comprising a multiplier for multiplying the number of photoelectrons moving toward said anode.

5. The detector as recited in claim 4, and further comprising a gate electrode disposed between said anode and said cathode for controlling the passage of said photoelectrons passing therethrough.

6. The detector as recited in claim 5 and further comprising circuitry for biasing said gate electrode at ground potential.

7. The detector as recited in claim 1 wherein the strength of the electric field can be adjusted to detect a preselected red color of infrared photons.

8. The detector as recited in claim 1 wherein said means for electrically connecting comprises a film of polytetrafluoroethylene material.

9. The detector as recited in claim 8 wherein said nanotubes are aligned generally perpendicular to said film.

10. The detector as recited in claim 1 wherein each of said nanotubes comprises a single layer of carbon atoms.

11. The detector as recited in claim 1 wherein said nanotubes have tips that serve to amplify the electric field by a factor of at least 50 times.

12. The detector as recited in claim 1 and further comprising a housing for said anode and said cathode, said housing including an aperture for receiving the infrared photons.

13. A detector for detecting infrared photons comprising:
    a housing having means for receiving the infrared photons;
    an anode;
    a cathode including a plurality of carbon nanotubes that are connected electrically;
    a gate electrode being disposed between said anode and said cathode; said anode, said cathode and said gate electrode being within said housing; and
    bias circuitry for applying an electric field between said anode and said cathode such that when infrared photons are absorbed by said nanotubes photoelectrons are created, said gate electrode serving to control the flow of photo-electrons therethrough.

14. The detector as recited in claim 13 and further comprising circuitry for measuring the number of photoelectrons.

15. The detector as recited in claim 13 and further comprising a multiplier disposed between said gate electrode and said anode for multiplying the number of photoelectrons.

16. The detector as recited in claim 13 and further comprising circuitry for biasing said gate electrode at ground potential.

17. The detector as recited in claim 13 and further comprising a film formed from conductive material for electrically interconnecting said nanotubes.

18. The detector as recited in claim 17 wherein said film comprises polytetrafluoroethylene material.

19. The detector as recited in claim 18 wherein said nanotubes are generally aligned perpendicular to said film.

20. The detector as recited in claim 13 wherein said nanotubes comprise carbon atoms.

21. The detector as recited in claim 20 wherein the carbon atoms are configured in a single layer.

* * * * *